F. X. LA LONDE.
SHOCK LOADING ATTACHMENT FOR FARM WAGONS.
APPLICATION FILED DEC. 24, 1908.

938,152.

Patented Oct. 26, 1909.
5 SHEETS—SHEET 2.

F. X. LA LONDE.
SHOCK LOADING ATTACHMENT FOR FARM WAGONS.
APPLICATION FILED DEC. 24, 1908.

938,152.

Patented Oct. 26, 1909.
5 SHEETS—SHEET 5.

WITNESSES
Harry King
G. A. Baldwin

INVENTOR
Francis X La Londe
By F. C. Somers
Attorney

UNITED STATES PATENT OFFICE.

FRANCIS X. LA LONDE, OF MOOSEJAW, SASKATCHEWAN, CANADA.

SHOCK-LOADING ATTACHMENT FOR FARM-WAGONS.

938,152.

Specification of Letters Patent. Patented Oct. 26, 1909.

Application filed December 24, 1908. Serial No. 469,141.

*To all whom it may concern:*

Be it known that I, FRANCIS XAVIER LA LONDE, a subject of the King of Great Britain, and a resident of Moosejaw, in the Province of Saskatchewan, in the Dominion of Canada, have invented certain new and useful Improvements in Shock-Loading Attachments for Farm-Wagons, whereof the following is a specification.

In the harvesting by machine of wheat, oats, rye, barley and other similar grain, the stalks are bound into sheaves by the binding attachment of the harvester and dropped in bunches of three or four sheaves at regular distance apart across the field and at irregular distances in line of travel of the machine, the distances in that direction being dependent upon the density or yield of the crop. A number of such bunches comprising ten sheaves more or less are stood in upright position and called a shock or stook.

The object of this invention is to provide a mechanism adapted to an ordinary farm wagon and preferably readily applicable to and removable from such a wagon for taking up the shocks of grain as the wagon traverses the field and loading them onto the wagon for conveyance to the thresher, stack or barn.

The invention comprises a spring actuated shock gripping mechanism tripped automatically to close around the shock by the resistance thereof as the gripper is pushed against it by the travel of the wagon, and operative through a suitable transmitting mechanism from a wheel of the wagon to lift the shock and deliver it automatically into the body of the wagon.

The same reference numbers indicate corresponding parts in all the figures, round numbers being generally used for separate elements and intermediate numbers for subordinate features thereof.

This grain shock loader is designed for farm wagons of any suitable construction to which the mechanism is applicable.

In the embodiment herein illustrated an ordinary wagon body 10 of somewhat heavy construction is supported on running gear usually employed in such vehicles. An open rack 20 is supported on the body 10 and is preferably detachable therefrom. The base of the rack 20 is composed of several transverse sills 21 which extend across the body 10 and overhang at opposite sides thereof, being more overhanging on one side than on the other for the purpose of counterbalancing the weight of the gripper mechanism hereinafter described. This rack 20 is provided with a floor 22 laid on said cross sills. The upper portion of the rack is composed of standards and slats of any suitable form. The rear corner of the rack on the gripper side is made lower than the main part, having a recess 23, to permit the gripper to swing freely over the top of the rack for the delivery of the shocks thereinto. The rack 20 is secured to the wagon body 10 by means of U-shaped bolts or clamps 15 or other suitable means.

Two machine standards 30 and 35 are bolted or otherwise secured to the floor of the rack on opposite sides thereof and in rear of the center thereof. These standards are shown in triangular form and are provided at their upper ends with shaft bearings 31 and 36.

The shock gripping mechanism may be arranged on either side of the wagon. It is shown on the left otherwise called the near side thereof, and a hanger 40 for supporting said mechanism is secured to the standard 30. This hanger depends from said standard below the plane of the floor of the rack on one side thereof. In the form shown this dependent hanger is composed of an approximately U-shaped strap or casting having inwardly inclined upper ends 41 and 42 which are secured by bolts or otherwise to the triangular standard 30. The closed lower end of this U-shaped bracket preferably bends downward in angular form and carries at its apex a shaft bearing 43 opposite the shaft bearing 14 of the body 10. Blocks 44 and 45 are secured underneath the floor of the rack to two adjacent intermediate sills 21 and to the hanger 40. A spacing brace 46 is disposed in the lower part of the hanger and rests against the lower edges of said blocks.

A driving pulley is secured to one of the hind wheels of the vehicle or otherwise so connected with the running gear thereof as to receive motion therefrom during the travel of the wagon. This pulley is shown in the form of a sprocket wheel 50 attached to one of the hind wheels.

A short transverse shaft 60, which serves as a driving shaft, is disposed in front of the rear axle parallel thereto and is journaled at its inner end in the shaft bearing 14 of the wagon body and at its outer end in the shaft bearing 43 in the hanger 40. This shaft carries a loose pulley 65 and a fixed pulley 70, the former receiving motion through a belt 55 from the driving pulley 50 and the latter delivering motion to the gripper driving shaft as hereinafter described. A driving clutch of any suitable construction is provided for locking the loose pulley 65 to the pulley 70. For this purpose the hub of the sliding loose pulley 65 is provided at one end with a groove 66 for engagement of a shipper lever and at the other end with clutch teeth 67, and the hub of the pulley 70 is provided at the end toward the loose pulley 65 with clutch teeth 71. A contractile spring 61 is disposed between a collar 62 on the shaft 60 and the sliding clutch member 70, and operates to thrust and hold said sliding clutch member in engagement with the fixed clutch member, except as disengagement is effected by an automatic clutch releasing mechanism hereinafter described.

Figure 1:
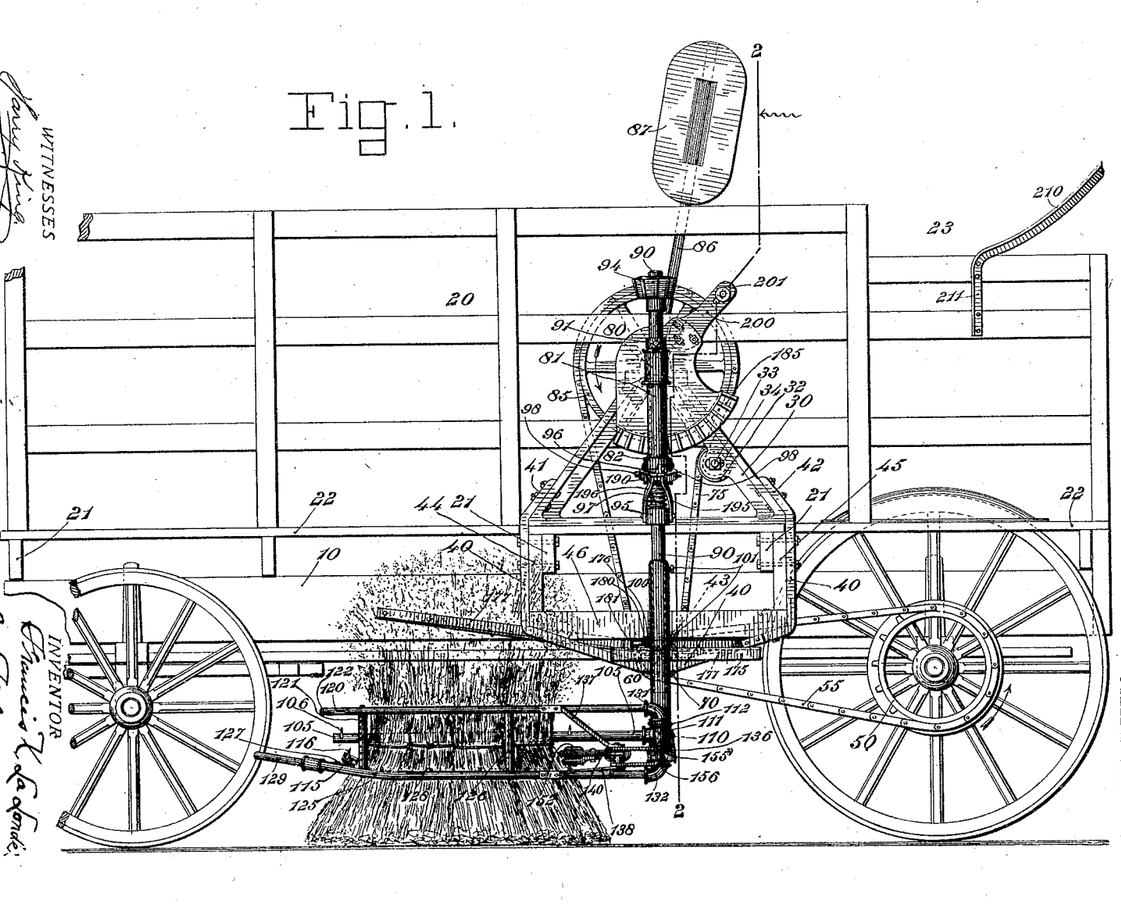
Figure 1 of the accompanying drawings represents a side elevation of an ordinary farm wagon provided with the preferred form of this shock loading mechanism (the housing for part of the transmitting mechanism being omitted), showing the gripper closed around a shock and other parts in the positions which they assume for an instant after the closing of the gripper around the shock before the forward movement of the wagon and the resistance of the shock have started the gripper in its rearward and upward swing.
Figures 2, 3, 13:
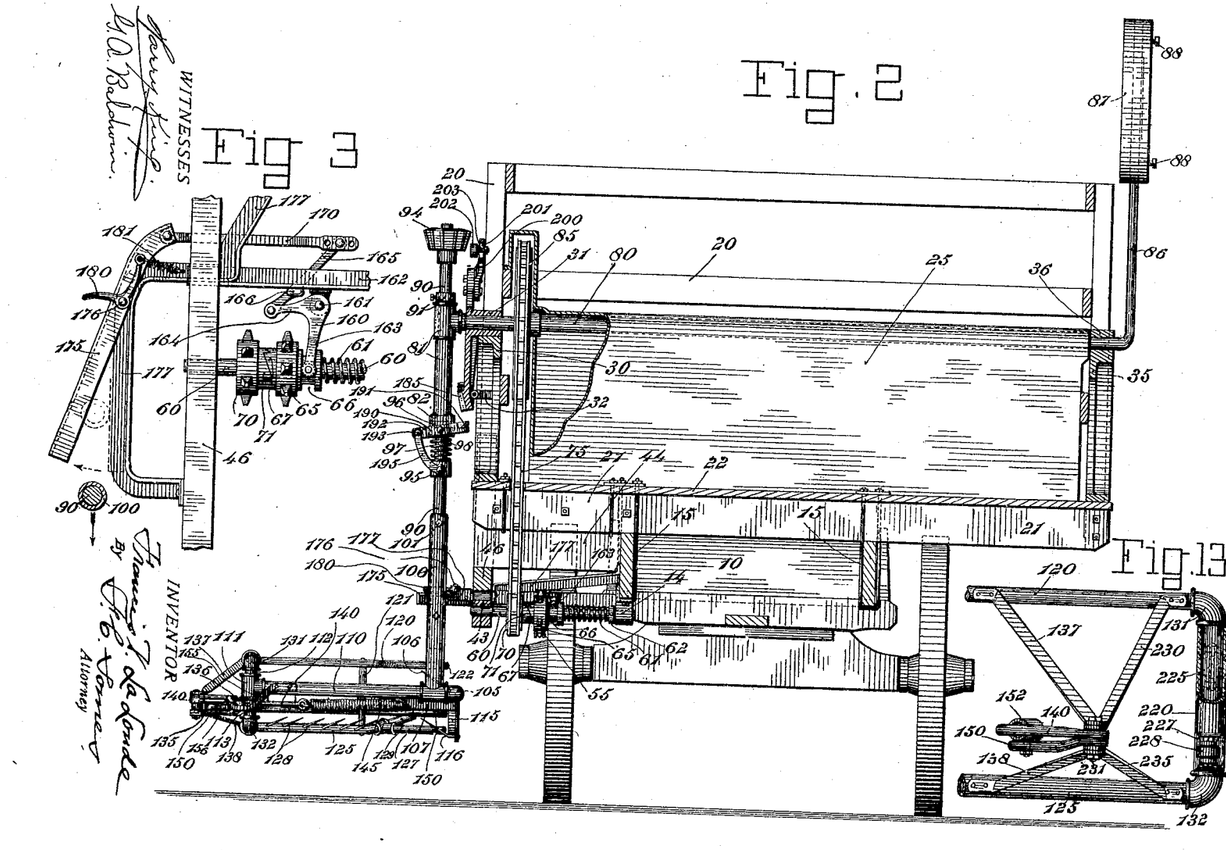
Fig. 2 represents an irregular transverse vertical section generally on lines 2—2 of Figs. 1 and 4.
Fig. 3 represents on an enlarged scale a plan of the driving clutch and its actuating means for putting the loading mechanism into and out of operative connection with the driving mechanism.
Fig. 13 represents a side elevation partly in section of a fragment of the hinged side jaw of the gripper showing a different form of hinge, brace, pull bar and connection of the latter.

A horizontal transverse shaft 80, which serves as a gripper driving shaft, is supported in the journal bearings 31 and 36 of the standards 30 and 35 and extends across the width of the rack 20 and projects beyond said rack at the opposite sides thereof as shown in Fig. 2. This shaft is provided near one side of the rack 20, preferably within said rack, with a pulley 85 which receives motion from the pulley 70 on the driving shaft 60 through a belt 75. The shaft 80 is provided at the end which projects at the near side of the wagon with a fixed sleeve 81 open at both ends and disposed at right angles to the axis of said shaft. This sleeve is longer on one side of the shaft than on the other, forming an L-shaped tubular extension thereof outside the wagon rack 20. The long end of the sleeve is provided with a fixed clutch member 82 hereinafter described. This sleeve is cast with the end of the shaft or secured thereto by any suitable means, and serves as a journal box for the gripper swing shaft hereinafter described. The shaft 80 is provided at the end which projects at the opposite side of the wagon with an arm 86 which projects at right angles to said shaft and forms another L-shaped extension thereof. This arm 86 extends approximately in opposite direction to the projection of the sleeve 81 at the other end of the shaft. When the sleeve 81 depends downward in vertical position from the shaft 80 as shown in Fig. 1, the arm 86 extends upward at a slight rearward incline from said shaft 80. A weight 87 is disposed on the arm 86 and tends to counterbalance the weight of the gripper, and to assist in the swing thereof as hereinafter described. This weight is preferably adjustable on said arm by set screws 88 or any suitable means. The wagon is weighted sufficiently by the weight 87 or otherwise to prevent skidding of the driving wheel and insure the operation of the shock loading mechanism.

A housing 25 shown in Fig. 2 in the rack 20, protects the shaft 80, pulley 85 and belt 75 from interference by the load carried in said rack. The pulleys and belts thus far described are preferably in sprocket form and are so shown. An idle pulley 32 on a stud 33 adjustable in a slot 34 in the standard 30, engages the belt 75 for taking up any slack thereof.

A gripper shaft 90, carrying at one end a shock gripper for grasping and loading the shocks, is supported at the other end in the sleeve or journal box 81 fixed to the end of the shaft 80 and is made to revolve or sweep around bodily in a vertical plane during the rotation of the shaft 80, for lifting and lowering the gripper, and to turn axially in said sleeve for swinging the gripper over the top of the shock receiving rack 20 for delivering the load as hereinafter described. This gripper shaft extends through the sleeve 81 and projects at the opposite ends thereof, and means are provided for holding the shaft in the sleeve during the revolving sweep of the former. The means shown for this purpose comprise a collar stop 91 set on the shaft adjacent to the short end of the sleeve 81 and one or more ribs or splines 92, preferably three in number, integral with or fixed on the shaft 90, with the inner ends forming shoulder stops 93 adjacent to the long end of said sleeve. These stops on the shaft severally rest against one end or the other of said sleeve in the different positions of the shaft in the revolving sweep thereof and prevent the shaft from sliding longitudinally in the sleeve. The gripper shaft 90 is provided some distance beyond the short end of the sleeve 80 with a beveled gear 94, and at a somewhat similar distance beyond the long end of said sleeve with a fixed collar 95.

Any suitable means may be provided for automatically maintaining the gripper shaft locked against rotation during parts of the loading operation. The means shown for this purpose, hereinafter referred to as the gripper clutch, comprise a sliding clutch member 96 movable on said shaft, and provided with spline grooves 99 engaged by the splines 92 on shaft 90 and with a spring 97 disposed on said shaft between the fixed collar 95 and said clutch member and operating to thrust and to normally hold said sliding member in locked connection with the fixed clutch member 82 on the sleeve 81.

A shock gripper for grasping, lifting and delivering a shock is connected with and supported by the gripper shaft 90. The shock gripper shown comprises fixed and hinged jaws connected with a tubular shank 100. This tubular shank is preferably adjustable by means of set screws 101 or otherwise on the lower part of said shaft. The shaft extends for a considerable distance into the tubular shank, the latter serving as a socket for the former. This tubular shank is provided at its lower end with a fixed L-shaped frame, comprising a forwardly extending grip bar 105 and a laterally extending arm 110. The grip bar 105 constitutes the fixed jaw of the gripper and when the latter is in normal position for grasping the shock, projects forward in line with the travel of the wagon. The arm 110 constitutes the back bar of the gripper and projects laterally outward substantially at right angles to the fixed jaw 105 and preferably in the same horizontal plane therewith. The grip bar or jaw 105 is provided with a number of tines 106 projecting laterally therefrom and disposed at proper distances apart for securely holding a shock, say six inches, more or less. A corner brace bar 107 spans the angle of the bars 105 and 110.

Figures 4, 14, 15:
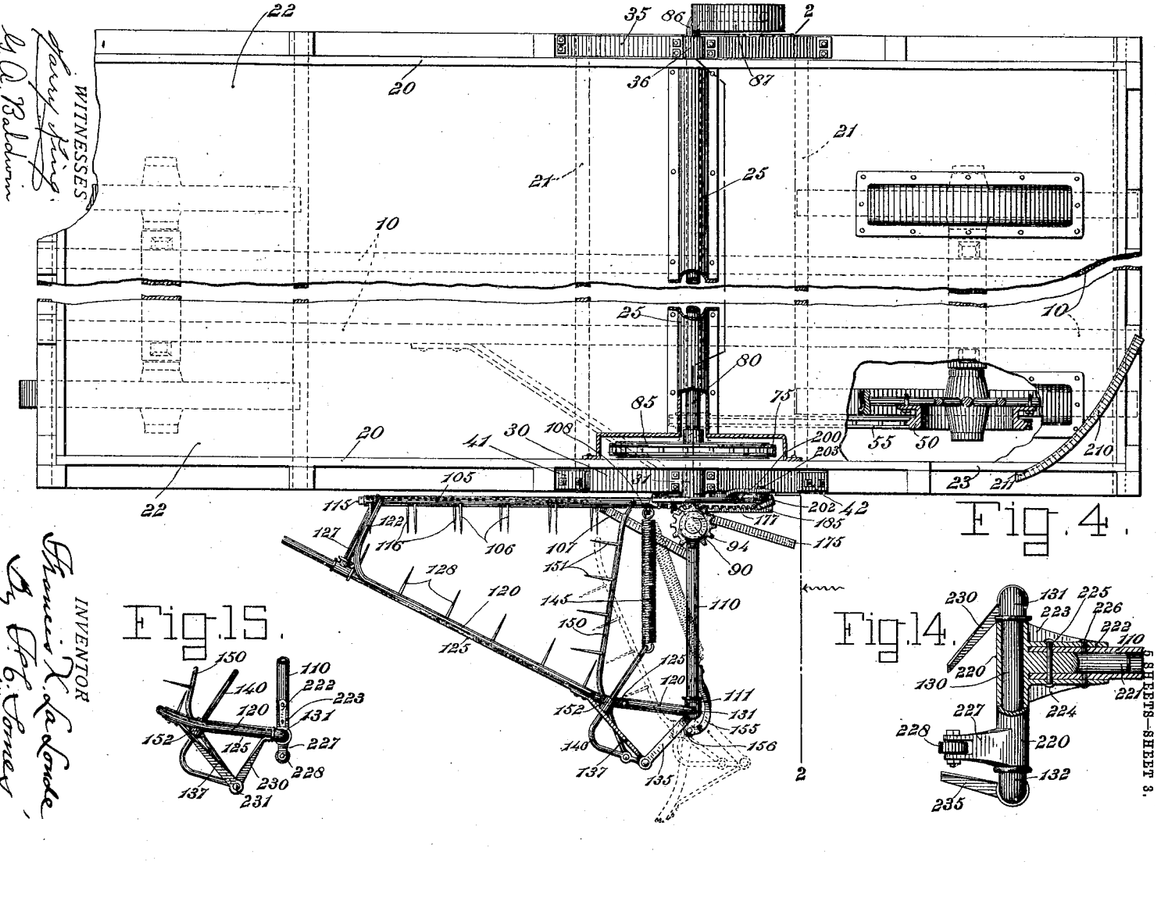
Fig. 4 represents a top plan view of a wagon provided with this loading attachment, parts being broken out for convenience of illustration, the shock gripper being in closed position.
Fig. 14 represents a rear elevation thereof partly in section.
Fig. 15 represents a plan view thereof.
Figures 5, 6, 7, 8:
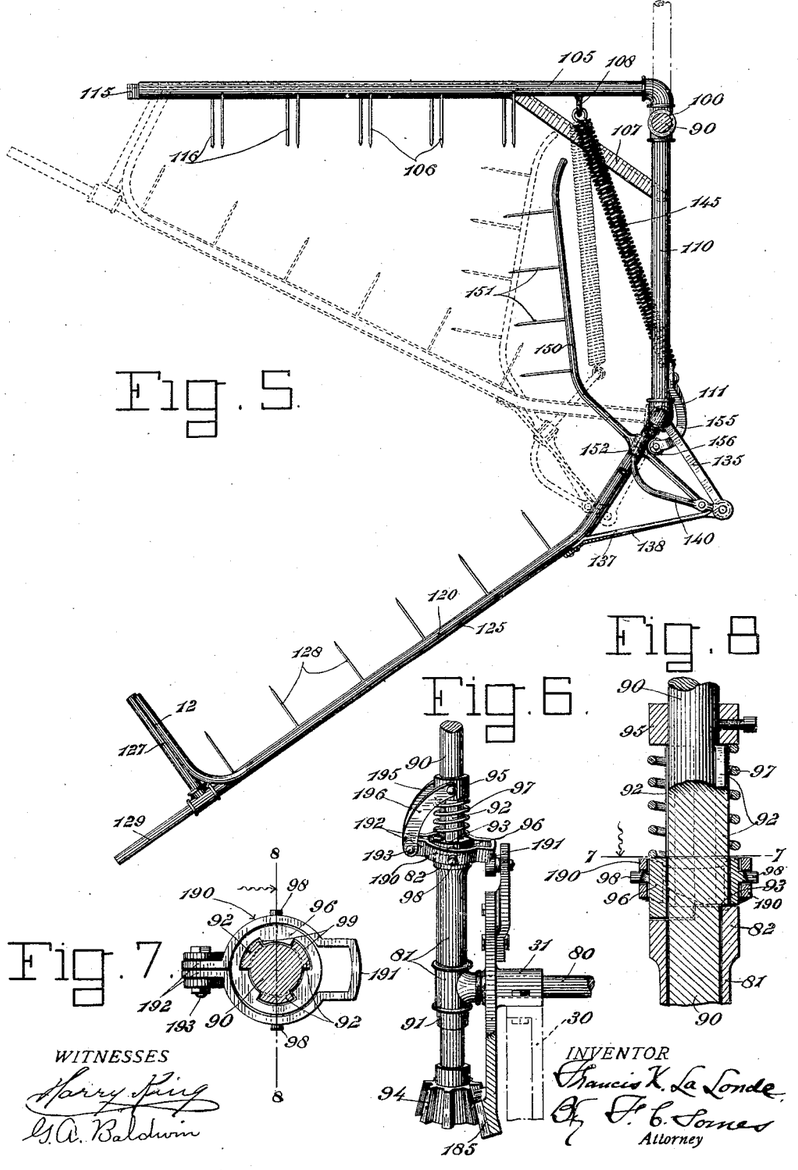
Fig. 5 represents on an enlarged scale a plan view of the shock gripper which is shown in full lines in open position ready to grip a shock and in dotted lines in closed position.
Fig. 6 represents on a larger scale a rear elevation of the gripper carrying mechanism in reverse of its position in Fig. 1, showing the end of the transverse shaft from which the gripper shaft is swung, the sleeve attached to said transverse shaft in which the gripper shaft is journaled, the clutch mechanism for locking the gripper shaft against axial rotation during the gripping and lifting of the shock, the means for releasing said clutch to permit the axial rotation of the gripper shaft, and means for rotating said shaft to swing the shock over the top of the wagon after the lifting thereof.
Fig. 7 represents on a still larger scale a transverse section on line 7—7 of Fig. 8 of the gripper shaft, showing in end elevation parts of the clutch and clutch releasing mechanism for said shaft.
Fig. 8 represents upon the same scale as Fig. 7 a longitudinal section on line 8—8 of Fig. 7 of the gripper shaft, its supporting sleeve, and the clutch mechanism for locking and releasing said parts.
Figure 9:
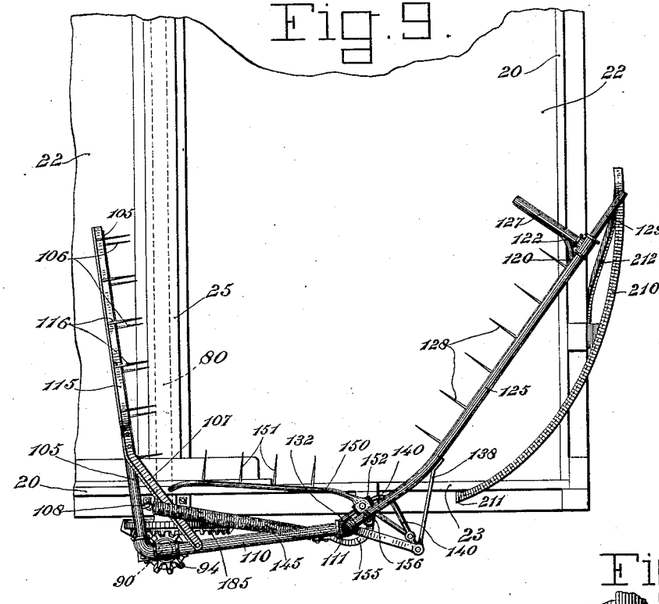
Fig. 9 represents on the same scale as Figs. 1 and 4 a top plan view of the rear portion of the shock receiving rack constituting a superstructure of the wagon body, showing the gripper in the position which it assumes after an endwise reversal of the gripper shaft from the positions of Figs. 1, 2 and 4, due to a half rotation of its supporting shaft and a quarter rotation of said gripper shaft, the gripper being open and in the position of delivering a shock over the top of said rack into the body thereof.

A supplemental grip bar 115 is preferably arranged underneath and about six inches more or less below the grip bar 105 and when so disposed constitutes a part of the fixed jaw of the gripper. This supplemental bar is provided with outwardly projecting tines 116 which are in staggered relation or otherwise to the tines of the bar 105. This supplemental grip bar is shown as integral with and as constituting an extension of the brace bar 107 which is bent downward as indicated in Figs. 4, 5 and 9 from a point near its point of connection with said grip bar 105 and extends forward parallel with said bar.

Figure 12:
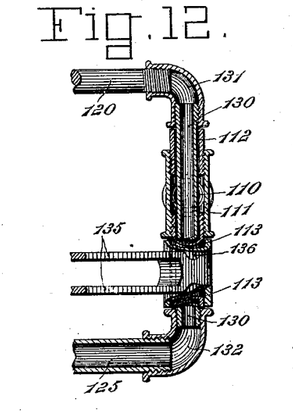
Fig. 12 represents on a large scale a vertical section of the parts constituting the pivotal connection of the main swinging jaw of the gripper with the fixed frame thereof.

The movable side jaw of the gripper is preferably hinged to the outer end of the back bar 110 and preferably composed of two gripper bars 120 and 125 disposed one above the other and rigidly connected together by vertical or other braces 121 and 126. The means shown for pivoting the hinged jaw of the gripper will now be described. The back bar 110 is provided at its outer end with a vertical bearing 111 which is shown in the form of a T-coupling whereof the vertical part is screw-threaded at its opposite ends and provided at its upper end with a nipple 112 and at its lower end with a longer nipple 113 as shown in Fig. 12. A pintle shaft 130 shown as tubular in form extends through said nipples and projects at its opposite ends above and below them as shown in Fig. 12. The projecting ends of this shaft are exteriorly screw-threaded and provided with elbows 131 and 132. The rear end of the upper gripper bar 120 is secured in the horizontal arm of the elbow 131 and the rear end of the gripper bar 125 is secured in the horizontal arm of the elbow 132. The pintle shaft 130 thus serves as the pivot for the swinging jaw of the gripper. The lower longer nipple 113 extends considerably below the bottom of the T-coupling 111.

The gripper bars 120 and 125 when the gripper is in closed position extend forward for a short distance approximately at right angles to the back bar 110 and thence incline somewhat toward the fixed jaw 100—105. The bar 120 is provided at its front end with a lateral arm 122 and the bar 125 is provided near its front end with a lateral arm 127. These arms 122 and 127 constitute the front end of the gripper when the latter is in closed position. The bar 125 is provided with lateral tines 128 projecting toward the fixed jaw for piercing the shock. The hinged jaw of the gripper is provided at its front end with a forward extension 129, shown as attached to the lower gripper bar 125, and serving as a gripper latch for opening the gripper as hereinafter described.

The shock gripper is provided with an automatic mechanism for closing it against or around the shock. The mechanism for this purpose will now be described. The hinged jaw of the gripper is provided near its rear end with an outward projection which in the form illustrated comprises a triangular brace. As shown in Figs. 1, 2, 4, 5 and 9, this triangular brace comprises a forked arm 135 connected by a sleeve 136 with the nipple 113 of the hinged jaw and by braces 137 and 138 with the gripper bars 120 and 125. A pull bar 140 in angular or curved form is pivoted at its outer end to said triangular brace, extends forward therefrom and thence laterally inward toward the fixed jaw of the gripper. A contractile spring 145 is connected at one end to the inner end of said pull bar and at the other end to an eye 108 of the fixed gripper bar 105. The pivot of the pull bar 140 and the connections thereof with the spring 145 is such that the line of tension of the spring when the gripper is closed is forward of the pivot of the hinged jaw and said line of tension when the gripper is open is in rear of said pivot, the angle or curvature of the pull bar permitting the rear end thereof to swing past the outer end of the back bar 110 without interference therewith. The spring will thus operate to hold the hinged jaw of the gripper in open or in closed position: and it is of such power or strength that it will operate to close said hinged jaw against the shock with sufficient force to cause the tines to engage the shock. The spring is also of sufficient strength to hold the gripper closed when the shock is lifted off the ground by the gripper as hereinafter described.

An automatic tripping mechanism is provided for actuating the gripper closing mechanism. This tripping mechanism is preferably capable of actuation by the resistance of a standing shock as the gripper moves against it. The form of tripping mechanism shown in Figs. 4 and 5 will now be described. A bar 150 which may serve the double purpose of a heel bar for the gripper and a trip bar for actuating the closing mechanism thereof, is pivoted at its outer end to the pull bar 140 somewhat in front of the pivot of said pull bar. This trip bar crosses the angle of the pull bar and thence extends laterally across the gripper in front of the back bar 110. It is provided with lateral tines 151 for penetrating the shock. A sleeve 152 is loose on the inner portion of the pull bar 140 and is swiveled by means of a lateral pinion or trunnion on the trip bar 150. The heel bar 150 operates to clamp the shock against the forward lateral arms 122 and 127 of the hinged jaw of the gripper, while the hinged side jaw of the gripper, comprising the bars 120 and 125, clamps the shock in lateral direction against the fixed jaw 105—115.

A stop is provided for the hinged jaw of the gripper to arrest its backward swing when it reaches a wide open position. The stop shown consists of a bent arm 155 attached at its inner end to the rear side of the back bar 110 and extending downward and forward around the outer end of said back bar to a point forward of the pintle of said hinged jaw. This stop is provided at its outer end with a rest preferably in the form of an anti-friction roller 156. When the hinged jaw is thrown wide open as shown in Fig. 5, the shank of the heel bar 150 comes in contact with and stops against the rest 156. In this position of the hinged jaw the line of tension of the spring 145 is behind the pivot of said jaw and operates to hold the latter in open position against the stop. As the heel and trip bar 150 comes in contact with a shock and is pushed backward thereby, the shank of said bar acts as a lever, the stop 155 serving as a fulcrum therefor, and pulls the arm 135 forward and swings the hinged jaw inward. As the hinged jaw commences to swing inward the sleeve 152 moves away from the rest 156 or stop and the point of connection of said sleeve with the pull bar 140 becomes a fulcrum of the trip bar 150. As soon as the jaw is swung inward sufficiently to shift the line of tension of the spring 145 forward of the pintle of said hinged jaw, the spring contracts and closes said jaw against the shock. The connection of the heel trip bar is such that in this closing movement, it is thrust forward into engagement with the shock as shown in dotted lines in Fig. 5, constituting a heel gripper bar.

Means are provided for automatically unclutching the driving clutch 65—70 so that the gripper shaft remains in vertical position or substantially so while the gripper approaches and grasps a shock. A clutch releasing mechanism herein shown especially in Fig. 3 for this purpose will now be described. A bell crank lever 160 is pivoted at 161 on a suitable support attached to a cross bar 162 connected at one end to the wagon body and at the other end to the spacing bar 46 of the hanger 40. The long arm 163 of the bell crank lever engages the groove 66 of the sliding pulley 65 on the driving shaft 60. A link 165 connects the short arm 164 of said lever with the inner free end of a link 170. A horizontal shipper lever 175 is pivoted at 176 to a broad U-shaped bracket 177 secured to the hanger 40. The forward end of this bracket is bent inward and extended forward and attached to the wagon body 10, said extension serving as a brace. The outer end of the link 170 is pivoted to the forward end of the shipper lever. The link 165 is provided with a lug 166 which slides slightly on the cross bar 162 in the swing of said link. The shipper lever 175 when in full line position of Fig. 3 permits the spring 61 to close the driving clutch 65—70 and when said shipper lever is swung into the dotted line position parallel with its supporting bracket the driving clutch is disconnected and the transverse shaft 80 which supports the gripper shaft remains stationary and permits said gripper shaft to depend during such disconnection in a vertical position or nearly so. In the vertical position of the gripper shaft, the gripper disposed at the lower end thereof, is carried along in position for grasping a shock. When the gripper shaft sweeps into its vertical position aforesaid, it engages the shipper lever 170 and swings it into closed position as shown in dotted lines in Fig. 3 and thereby opens the driving clutch. While the gripper shaft 90 remains vertical or nearly so and while during its backward swing under the resistance of a shock, it rides in contact with the outer face of the shipper lever 175, said gripper shaft holds the shipper lever closed and the driving clutch open.

A spring latch 180 is provided for holding the gripper shaft 90 against any tendency of the weight 87 to swing it forward in a retrograde motion after it has assumed a vertical position. This latch is shown in the form of a bell crank lever pivoted on the same pivot as the shipper lever 175. A spring 181 is connected to one arm of this latch and the other arm extends outward in the path of the swing of the gripper shaft. The latch yields to permit the gripper shaft to pass and then springs outward in front of said shaft and serves to hold it as aforesaid. As soon as the gripper shaft 90 passes the rear end of the shipper lever 175 the spring 61 closes the driving clutch, the transverse shaft 80 is rotated, the gripper shaft is swung or revolved bodily in a vertical plane and the gripper attached to one end thereof is carried backward and upward.

Means are provided for rotating the gripper shaft to swing the gripper over the top of the shock rack after the sweep of the gripper shaft has elevated the gripper to the proper point. The means shown for this purpose comprise a fixed segmental rack 185 supported on the standard 30 and the beveled gear 94 on the gripper shaft. The fixed segmental rack may be formed integral with the journal bearing 31 as shown in Fig. 2. This segment is equal to the circumference of said beveled gear whereby it is adapted to cause one complete rotation of the gripper shaft once during a part of each revolution thereof. The back of the segment is secured to a brace 32 forming a part of the standard 30 whereby vibration is prevented.

Figure 10:
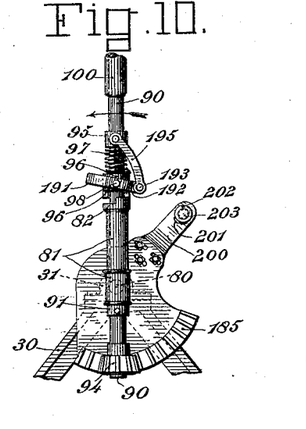
Fig. 10 represents on a larger scale a side elevation of the gripper shaft and its supporting sleeve, the clutch mechanism therefor, the clutch releasing mechanism and the means for rotating the gripper shaft when the clutch is released.
Figure 11:
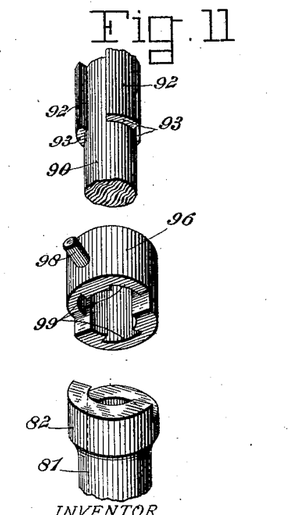
Fig. 11 represents in perspective on a still larger scale parts of the gripper shaft and its supporting sleeve, showing the clutch connection thereof.

An automatic trip mechanism is provided for releasing the gripper shaft clutch 96—82 hereinbefore described to permit said shaft to rotate for the purpose of swinging the gripper carrying the shock into position for delivery thereof into the wagon rack 20. Any suitable mechanism may be employed for this purpose. The mechanism shown comprises a trip cam 190 in the form of a yoke surrounding the sliding clutch member 96 on the gripper shaft. This yoke is pivoted on trunnions 98 on said clutch member and is provided on one side of the shaft with a cam 191 and on the other side at the open end of the yoke with ears 192. A bolt 193 connects said ears. Links 195 and 196, pivoted at one end on the fixed collar 95 on the gripper shaft 90 and at the other end on the bolt 193, tend to hold the yoke 190 normally in inclined position as shown in Figs. 1, 2 and 10. The bolt 193 serves as a fulcrum on which the yoke swings when the sliding clutch member 96 is moved up or down on the gripper shaft 90. A fixed arm 200 having a slot 201 is adjustably secured to the shank or disk of the segment rack 185 near the upper edge thereof. The disk may be integral with the bearing 31. A friction roller 202 is secured on said arm by a stud 203 which engages the slot 201 and is adjustable therein. This friction roller serves as an actuating device for the trip mechanism which releases the gripper clutch 76—85, said gripper clutch normally holding the gripper shaft against rotation when not so released by the trip mechanism. When the gripper shaft 90 is bodily swung around in a vertical plane having the shaft 80 as the axis of its movement the trip cam 190 engages the roller 200 or any equivalent fixed stop and the inner end of said cam is swung upward and the clutch member 96 is thereby pushed upward and disengaged from the clutch member 82, whereby the shaft 90 is permitted to turn on its axis. The word "upward" as used in respect to the movement of the cam and the sliding clutch member has reference to the position of the gripper shaft as shown in Figs. 6, 7, 8, 10 and 11, being the reverse of the position of said shaft as shown in Figs. 1, 2 and 4. As soon as the gripper shaft 90 begins to rotate it carries the clutch member 96 thereof around with it so that its semi-circular tooth is out of register with the semi-circular recess in the clutch member 82, and after the trip cam 190 passes the stop 200 the clutch member 96 remains out of engagement with the clutch member 82 until the gripper shaft 90 has made one complete rotation and again brought the semi-circular tooth of the clutch member 96 into register with the corresponding recess in the clutch member 82.

A gripper opener is secured to the end of the rack 20 on the gripper side thereof. The gripper opener shown comprises a cam bar 210, having at one end an attaching shank 211 and at the other end an attaching brace 212. The shank 211 is secured to the side bars at one end of said rack and the cam bar extends upward, rearward and across a rear corner of the rack. The position of this cam bar is such that it is engaged by a latch 129 of the hinged jaw of the gripper as the latter swings over the wagon rack, and its shape is such that the engagement of said catch therewith will cause the opening of the gripper during such overswing thereof.

In Figs. 13, 14 and 15 another and preferred form of hinge connection between the swinging side jaw 120—125 and the back bar 110 is shown. A different form of stop is illustrated and the end pivot of the heel bar 150 is the same as that of the pull bar 140. A sleeve 220 designed as a substitute for the sleeve 111 of the preceding figures forms the vertical bearing for the pintle 130. This sleeve is provided with a lateral stud 221 preferably integral and with an integral sleeve 222 outside said stud and concentric therewith, said sleeve being reinforced by brace ribs 223 and 224. The stud 221 fits into the outer end of the tubular back bar 110 and the sleeve 222 fits over said bar. Rivets 225 and 226 securely fasten this bearing to the back bar 110 in rigid upright position. The nipples 111 and 112 of the construction shown in Fig. 12 are omitted and the pintle 130 fits directly into the sleeve 220, the latter extending between the elbows 131 and 132. The sleeve 220 is provided with an integral arm 227 which serves as a stop for the hinged side jaw of the gripper in place of the stop 155 shown in Fig. 4. The stop 227 is preferably provided with an anti-friction roller 228. The pintle and bearing 220, stud 221, sleeve 222 and rest 227 may be cast in one piece.

As shown in Figs. 13 and 15 the lateral projection at the rear portion of the hinged side jaw 120—125 is in somewhat different form from that shown in previous figures. Such lateral projection in either case serves as a support for the rear gripper bar 150 and for the pull bar 140 tripped thereby for closing the gripper. In the preferred form shown in said Figs. 13 and 15 the lateral projection of the hinged jaw comprises the braces 137 and 138 of the former construction and braces 230 and 235 in lieu of the forked arm 135 of said former construction. The inner ends of the bars 230 and 235 are connected to the rear ends of the bars 120 and 125 and at their outer ends united with the outer ends of the bars 137 and 138 forming a triangular brace. The pull bar 140 and the gripper bar 150 are both pivoted at their outer ends on the pivot 231.

The operation of the mechanism when arranged as illustrated will now be described. The gripper shaft being substantially in vertical position the same as in Figs. 1, 2 and 4 and the gripper in open position as shown in full lines in Fig. 5, the wagon is driven so that the open gripper will travel along a line of standing shocks. As the gripper approaches a shock the fixed jaw 105 passes on one side thereof and the outwardly swung hinged jaw 120 passes on the other side thereof. The auxiliary gripper bar 150 at the heel of the gripper first comes in contact with the shock and as the wagon continues to travel the resistance or pressure of the shock pushes, so to speak, this heel gripper bar 150 backward and it acts as a lever, swinging on the stop 156 as a fulcrum. This backward movement of the heel gripper bar causes the rear end of its shank to swing forward, pulling with it the forked arm 135 and causing the main hinged gripper jaw 120 to swing toward the fixed jaw 105. As soon as the end of the bent rod 140 to which one end of the spring 145 is attached, passes forward of the pivotal point of the main jaw, the contractile tension of said spring pulls the hinged gripper jaw into closed position as shown in dotted lines in Fig. 5 and in full lines in Figs. 1 and 4. As the hinged jaw of the gripper closes toward the fixed jaw thereof, the pins, tines or teeth on the gripper bars penetrate the shock on opposite sides thereof and the heel gripper bar moves forward and causes its tines to penetrate the rear of the shock. The hinged gripper bar will swing more or less toward the fixed jaw of the gripper according to the size or bulk of the shock. The gripper will hold the shock with sufficient grip to permit it to be lifted bodily off the ground.

As the wagon continues to travel the pivotal point of the gripper shaft 90 is carried forward and the weight or resistance of the shock in the grasp of the gripper retards the movement of the latter and the shipper lever 175 is carried forward past said shaft. As this lever escapes from the holding contact of the gripper shaft the driving clutch 65—70 is permitted to close under the action of the spring 61. Motion is then communicated from the driving shaft 60 to the transverse shaft 80. The turning of said transverse shaft causes the gripper shaft to sweep bodily around and in making approximately a half revolution, the gripper carrying the shock is swung upward to a proper height for the delivery of the shock over the top of the wagon.

In the sweep of the gripper shaft the trip cam 190 engages the stationary clutch releasing device 202 and opens the gripper clutch 82 which holds the gripper shaft and permits the shaft to rotate axially. Just after the opening of the gripper clutch, when the gripper shaft is reversed and at an angle of 80 degrees, more or less, the beveled gear 94 on the end thereof engages the stationary rack 185, the gripper shaft is rotated axially, and the gripper carrying the shock is swung thereby inwardly over the top of the wagon rack 20.

During the inward sweep of the gripper the latch 129 on the hinged jaw thereof engages the cam bar 210 attached to the body of the wagon rack. This engagement causes the hinged jaw to remain stationary while the fixed jaw continues to swing laterally, and the gripper opens over the top of the wagon rack 20 and delivers the shock into said rack of wagon.

The weight 87 besides its function of counterbalancing more or less the weight of the gripper and its load, and its function of holding the gripper shaft in vertical position during the approach toward and grasping of the shock, also acts as a lever to assist in the opening of the gripper for the delivery of the shock. The angle of the arm 86 on which the weight 87 is supported is such that when the gripper latch 129 engages the cam bar 210, the weight is still in elevated position and tends to aid the swing of the gripper shaft during the opening operation and imparts sufficient auxiliary force to prevent skidding of the driving wheel.

After the shock drops from the gripper the driving clutch on the main shaft 61 remains closed, the transverse shaft 80 continues to rotate, the gripper shaft 90 continues on its revolving sweep and also continues to rotate axially. When the beveled gear 94 passes the rear end of the segmental rack 185, the gripper shaft has made one complete rotation, and caused the gripper to be swung outward away from the wagon body. As the gripper shaft completes its rotation the clutch member 96 thereon falls into locked position with the clutch member 82 on the sleeve 81, whereby the gripper shaft is prevented from rotation. As the transverse shaft 80 completes one rotation, the gripper shaft 90 completes one revolution or sweep and engages the shipper lever 175 and disconnects the driving clutch, so that the gripper shaft remains in vertical position. By these rotary and swinging movements of the gripper shaft, occurring after the delivery of the shock, the gripper, which remains open, is brought into initial position ready for grasping another shock. As the wagon is drawn forward the gripping and loading mechanism remains inactive until the gripper comes in contact with the next shock and the operation above described is repeated.

The mechanism is timed to make one complete operation during the traverse of the wagon the shortest distance between two shocks, say 20 feet more or less. When the shocks are farther apart the wagon will simply traverse the additional distance without action of the loading mechanism. The mechanism may be applied to motor driven as well as other farm wagons.

I claim as my invention—

1. The combination of a rotary shaft, a shaft bearing carried thereby at an angle thereto, a rotary revolving shaft supported in said shaft bearing, and a gripper carried by said rotary revolving shaft.

2. The combination of a rotary shaft, a driving mechanism therefor, a shaft bearing, a rotary revolving shaft supported in said shaft bearing, a gripper carried by said rotary revolving shaft, and automatic means for connecting and disconnecting said driving mechanism.

3. The combination of a rotary shaft, a shaft bearing carried thereby, at an angle thereto, a rotary revolving shaft supported in said shaft bearing, a gripper carried by said rotary revolving shaft, and means for intermittently rotating said rotary revolving shaft.

4. The combination of a rotary shaft, a shaft bearing carried thereby, at an angle thereto, a rotary revolving shaft supported in said shaft bearing, a gripper carried by said rotary revolving shaft, means for intermittently rotating said rotary shaft, means for closing the gripper for taking its load, and means for opening the gripper for delivery of the load.

5. The combination of a rotary shaft, a shaft bearing carried thereby, at an angle thereto, a rotary revolving shaft supported in said shaft bearing, means for intermittently rotating said rotary revolving shaft, means for closing the gripper, and means for opening the gripper while the rotary revolving shaft is in reversed position.

6. The combination of a horizontal rotary shaft, a shaft bearing carried thereby, at an angle thereto, a driving mechanism for said shaft, a rotary revolving shaft supported in said shaft bearing, a gripper carried at the lower end of said rotary revolving shaft, means for holding the gripper in open position during the approach to a shock, means for holding said rotary shaft in vertical position during such approach, means for causing automatic closing of the gripper around the shock, automatic means for connecting said driving mechanism with said rotary shaft for revolving the rotary revolving shaft, means for imparting a rotary motion to said rotary revolving shaft during a part of the revolution thereof, and means for opening said gripper while the gripper shaft is rotating.

7. The combination of a wagon body, a transverse shaft supported therein and projecting at one side thereof, a gripper mechanism supported by said shaft, and means for operating said shaft and gripper mechanism.

8. The combination of a wagon rack provided with a corner recess and with a cam bar adjacent thereto and adapted to serve as a gripper opener, a gripper suspended from said wagon rack and means for swinging said gripper into contact with said cam bar.

9. The combination of a wagon body, machine standards disposed thereon, a hanger dependent from one of said standards, a shaft supported in said standards, a gripper mechanism supported by said shaft, a driving shaft supported at one end by said hanger, and mechanism connecting said driving shaft with said supporting shaft.

10. The combination of a wagon rack, a transverse shaft supported therein, a pulley on said shaft, a loading mechanism, and a housing within said rack inclosing said shaft and pulley.

11. The combination of a wagon rack, a transverse shaft supported in bearings of said rack and provided at one end outside said rack with a sleeve at right angles thereto, a shaft journaled in said sleeve, and a loading mechanism connected with said shafts.

12. The combination of a wagon rack, a transverse shaft supported in bearings of said rack and provided at one end with a sleeve at right angles to said shaft, a shaft journaled in said sleeve, a clutch mechanism for uniting the shaft and sleeve, and a loading mechanism.

13. The combination of a wagon rack, a transverse shaft supported therein, a loading mechanism supported at one end of said transverse shaft outside said rack, and a weighted arm on said shaft.

14. The combination of a wagon rack, a transverse shaft supported therein, a loading mechanism supported at one end of said transverse shaft outside said rack, and a weighted arm on said shaft disposed approximately at ninety degrees to the shank of the loading mechanism.

15. The combination of a wagon rack, a transverse shaft supported therein, a loading mechanism supported at one end of said transverse shaft outside said rack, and a weighted arm on said shaft disposed approximately at ninety degrees to the shank of the loading mechanism, said arm being inclined somewhat to the rear when said shank is in vertical position.

16. The combination of a wagon body, a transverse shaft supported thereon, a shaft supported by said transverse shaft at right angles thereto outside said wagon body and adapted to sweep bodily in a vertical plane and to rotate axially, and a loading mechanism connected with said shafts.

17. The combination of a horizontal shaft, a sleeve fixed to one end thereof at right angles thereto and provided with a clutch member, a gripper shaft journaled in said sleeve and provided with stops for engagement with opposite ends of said sleeve, a clutch member adapted to slide on said gripper shaft, and means for actuating said sliding clutch member.

18. The combination of a horizontal shaft, a sleeve fixed to one end thereof at right angles thereto and provided with a clutch member, a gripper shaft journaled in said sleeve and provided with stops for engagement with opposite ends of said sleeve, a clutch member adapted to slide on said gripper shaft, means for holding said sliding clutch member in engagement with the sleeve clutch member, and automatic means for separating said clutch members.

19. The combination of a horizontal shaft, a sleeve fixed to one end of said shaft at right angles thereto, a gripper shaft journaled in said sleeve, a gripper, clutch members disposed respectively on the sleeve and gripper shaft, means for clutching and means for unclutching said clutch members.

20. The combination of a rotary shaft, a sleeve fixed to one end of said shaft at right angles thereto, a gripper shaft journaled in said sleeve, a gripper, clutch members disposed respectively on the sleeve and gripper shaft, means for clutching and means for unclutching said clutch members, and means for holding said clutch members apart during a complete rotation of the gripper shaft.

21. The combination of a horizontal shaft, a sleeve fixed to one end of said shaft at right angles thereto, a gripper shaft journaled in said sleeve, a gripper, clutch members connected with said sleeve and gripper shaft respectively, automatic means for clutching said clutch members, a pivoted yoke connected with the sliding clutch member, and a stationary actuating device engaging said yoke for releasing the clutch at a given point in the revolutionary sweep of the gripper shaft.

22. The combination of a rotary shaft, a sleeve carried by said shaft at right angles thereto, a rotary revolving shaft journaled in said sleeve, a gripper carried by said rotary revolving shaft, a pinion on said rotary revolving shaft, and a segmental rack engaged by said pinion in the sweep of said rotary revolving shaft for rotating the latter.

23. The combination of a rotary shaft, a sleeve carried by said shaft at right angles thereto, a rotary revolving shaft journaled in said sleeve, a gripper carried by said rotary revolving shaft, a pinion on said rotary revolving shaft, a segmental rack engaged by said pinion in the sweep of said rotary revolving shaft for rotating the latter, and means for locking the last named shaft against rotation during a part of its sweep.

24. A gripper for grasping its load comprising a suspension shank, an angular frame secured to the lower end of said shank at right angles thereto, one arm of said frame constituting a side jaw of the gripper and the other arm thereof constituting the back bar of the gripper, a swinging jaw hinged to said back bar, and automatic means for closing said swinging jaw.

25. A gripper for grasping its load comprising a suspension shank, an angular frame secured to the lower end of said shank at right angles thereto, one arm of said frame constituting a side jaw of the gripper and the other arm thereof constituting the back bar of the gripper, a swinging jaw hinged to said back bar, a supplemental bar secured to said side jaw and constituting a part thereof, and automatic means for closing said swinging jaw.

26. A gripper for grasping its load comprising a suspension shank, an angular frame secured to the lower end of said shank at right angles thereto, one arm of said frame constituting a side jaw of the gripper and the other arm thereof constituting the back bar of the gripper, a swinging jaw hinged to said back bar, automatic means for closing said swinging jaw, and a heel gripper bar adapted to serve as a trip device for said means.

27. A gripper for grasping its load comprising a suspension shank, an angular frame secured to the lower end of said shank at right angles thereto, one arm of said frame constituting a side jaw of the gripper and the other arm thereof constituting the back bar of the gripper, a swinging jaw hinged to said back bar, an outwardly extending arm connected with said swinging jaw and adapted to swing forward and backward of the line of said back bar, a pull bar pivoted to the outer end of said arm, a spring connected with said pull bar and having its line of tension in rear of the pivot of the hinged jaw when the latter is in open position and in front thereof when in closed position.

28. A gripper comprising a suspension means, two side jaws, a rear jaw, and means for closing said jaws.

29. A gripper comprising side jaws, a rear jaw, and a spring mechanism for closing said gripper, the rear jaw serving as a trip device for actuating said mechanism.

30. A gripper comprising a suspension shank, two side jaws, a rear jaw, and means for closing the side jaws and swinging the rear jaw forward.

31. A gripper comprising a suspension shank, two side jaws, a back bar connecting said jaws, a rear jaw, and means for closing said side jaws and swinging forward the rear jaw.

32. A gripper comprising a suspension shank, an L-shaped frame whereof one arm serves as a side jaw and the other as a back bar, and a side jaw hinged to said back bar, the latter being provided with a forwardly disposed laterally projecting arm.

33. A gripper comprising a suspension shank, an L-shaped frame whereof one arm serves as a side jaw and the other as a back bar, and a side jaw hinged to said back bar, the latter being composed of two bars, one disposed above the other.

34. A gripper comprising a suspension shank, jaws having tines, one of said jaws being hinged to swing laterally toward the other, and a closing mechanism therefor comprising a spring-actuating mechanism in which the line of tension of said spring is shifted to the rear of the fulcrum of the jaw in the opening thereof and forward of said fulcrum in the closing thereof whereby the spring will hold the jaw in either open or closed position.

35. A gripper comprising a side jaw composed of two bars disposed in the same vertical plane, a rigid back bar, and a side jaw hinged to said back bar and comprising two connected bars disposed in the same plane and provided with lateral arms at the front thereof.

36. A gripper comprising a side jaw composed of two bars disposed in the same vertical plane, a rigid back bar, and a side jaw hinged to said back bar and comprising two connected bars disposed in the same plane and provided with lateral arms at the front thereof with a latch bar adapted to serve as an opener for the gripper.

37. A gripper comprising an angular frame whereof one arm constitutes a side jaw and the other arm a back bar, a side jaw hinged to the outer end of said back bar, an arm pivoted on the pivot of said hinged jaw and having an angular connection with the latter at its outer end, a stop attached to said back bar, a pull bar pivoted to the outer end of said arm, a rear gripper bar pivoted at its outer end and adapted to rest against said stop when the hinged jaw is in open position, and a spring connecting the inner end of said pull bar with the opposite side of the gripper.

38. A gripper comprising an angular frame whereof one arm constitutes a side jaw provided with tines and the other arm constitutes a back bar, a sleeve disposed at the outer end of said back bar perpendicular thereto, a pintle extending through said sleeve, a hinged side jaw comprising two connected bars supported on opposite ends of said pintle, an arm hinged at its inner end to said pintle and connected at its outer end by braces with the upper and lower bars of said hinged jaw, and means for closing said hinged jaw.

39. A gripper comprising an angular frame whereof one arm forms a side jaw and the other a back bar, a stop on said back bar, a side jaw hinged to said back bar, a link hinged at its inner end to said back bar, and means pivoted to the outer end of said link for closing said hinged side jaw.

40. A gripper comprising a suspension shank, a back bar, a side jaw, a side jaw hinged to the back bar, and means for swinging one side jaw toward the other.

41. A gripper comprising a suspension shank, a back bar at right angles thereto, a side jaw, a side jaw hinged to the back bar, and means for swinging one side jaw toward the other.

42. A gripper comprising a suspension shank, a back bar, a side jaw provided with tines, a side jaw provided with tines and hinged to the back bar, and means for swinging one side jaw toward the other.

43. A gripper comprising a suspension shank, a back bar, a fixed side jaw, a side jaw hinged to the back bar, and means for swinging said hinged jaw toward said fixed jaw.

44. A gripper comprising a suspension shank, a back bar, a side jaw, a side jaw hinged to the back bar and composed of two connected side bars disposed one above the other, and means for swinging one side jaw toward the other.

45. A gripper comprising a suspension shank, a back bar, a side jaw, an inwardly bent side jaw hinged to the back bar, and means for swinging one side jaw toward the other.

46. A gripper comprising a suspension shank, a back bar, a side jaw, a side jaw hinged to the back bar, a rear jaw, and means for simultaneously closing the side jaws and swinging forward the rear jaw.

47. A gripper comprising a suspension shank, a back bar, a side jaw, an inwardly bent side jaw hinged to the back bar, a bent rear jaw pivoted at its outer end, and means for simultaneously closing the side jaw and swinging forward the rear jaw.

48. A gripper comprising a suspension shank, a back bar, a side jaw, a side jaw provided with a lateral front arm, and means for swinging one side jaw toward the other.

49. A gripper comprising a suspension shank, a back bar, a side jaw, a side jaw hinged to the back bar and composed of two connected side bars disposed one above the other and provided with forward lateral arms, and means for swinging one side jaw toward the other.

50. A gripper comprising a suspension shank, a back bar, a side jaw, a side jaw hinged to the back bar and composed of two connected side bars disposed one above the other and provided with forward lateral arms, and with an opening latch, and means for swinging one side jaw toward the other.

51. A gripper comprising a suspension shank, a back bar, a side jaw, a side jaw hinged to the back bar, an outwardly extending brace at the rear part of the said hinged side jaw, a pull rod pivoted at its outer end to said brace and extending forward and inward therefrom, a sleeve loose on said rod, a heel bar having a pivotal connection with said brace, and a spring for actuating said pull bar.

52. In a loading machine the combination of a gripper having a horizontal swinging jaw, a vertical suspension device therefor, a vehicle carrying said gripper horizontally into contact with the matter to be loaded, means for operating said suspension device to swing said gripper upward, and means for opening and closing said gripper.

53. In a loading machine the combination of a gripper having a horizontal swinging jaw, a vertical suspension device therefor, a vehicle carrying said gripper horizontally into contact with the matter to be loaded, means for operating said suspension device to swing said gripper upward, and automatic means for closing said gripper.

54. In a loading machine the combination of a gripper having a horizontal swinging jaw, a vertical suspension device therefor, a vehicle carrying said gripper horizontally into contact with the matter to be loaded, means for operating said suspension device to swing said gripper upward, and means for opening said gripper.

55. The combination of a wagon, a pulley secured to the running gear thereof, a driving shaft, fixed and loose pulleys on said driving shaft, a gripper supporting shaft, a pulley disposed thereon, a gripper shaft carried by said gripper supporting shaft, a gripper carried by said gripper shaft, a belt connecting said running gear with one of the driving shaft pulleys, a belt connecting another driving shaft pulley with said gripper supporting shaft pulley, a clutch mechanism on said driving shaft, means for closing said clutch mechanism, and means actuated by the movement of the gripper to release said clutch mechanism.

56. The combination of a wagon, a transverse shaft supported thereon and projecting at one side thereof, a revolving rotary gripper shaft carried by said transverse shaft, a gripper carried by said gripper shaft, actuating mechanism connecting said transverse shaft with the running gear of the wagon, and, means for rotating said gripper shaft.

FRANCIS X. LA LONDE.

Witnesses:
  F. C. SOMES,
  PAUL E. JOHNSON.